April 5, 1932.   F. D. GRUND   1,852,009
DOOR LATCH
Filed Oct. 20, 1930
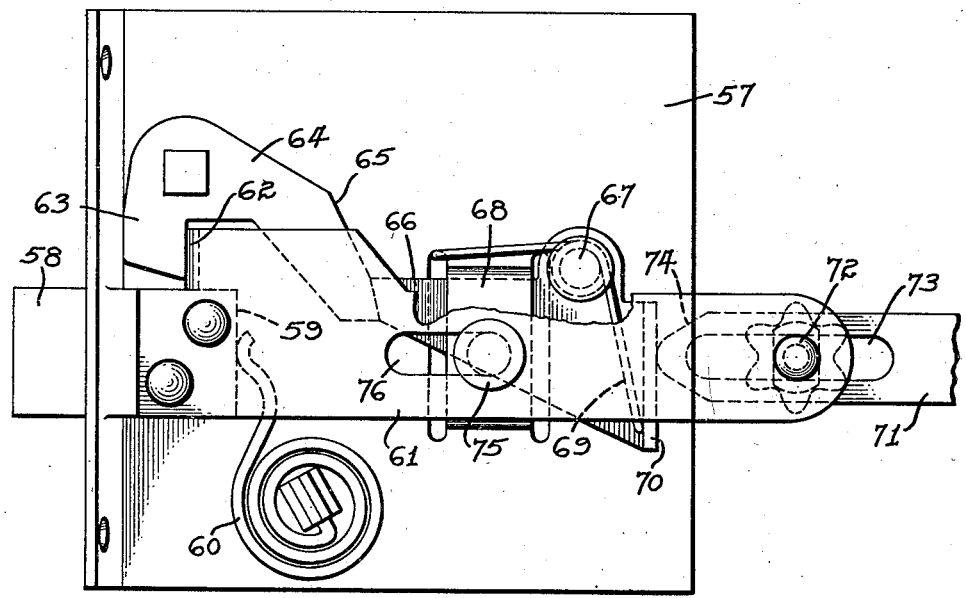
Inventor
Fletcher D. Grund
By Owen & Owen
Attorneys Patented Apr. 5, 1932

1,852,009

UNITED STATES PATENT OFFICE

FLETCHER D. GRUND, OF WESTON, OHIO, ASSIGNOR TO THE AMERICAN SWISS COMPANY, OF TOLEDO, OHIO, A CORPORATION OF OHIO

DOOR LATCH

Original application filed January 5, 1929, Serial No. 330,537. Divided and this application filed October 20, 1930. Serial No. 439,729.

This invention relates to door latches, but more particularly to door latches generally used on vehicles, such as automobiles, and an object is to produce a simple and efficient door latch having the new and improved features of construction, arrangement and operation hereinafter described.

The invention is shown by way of illustration, but not of limitation in the accompanying drawing, in which The figure is a side elevation of a door latch, a portion of the remote control strap being shown, but the remote control handle mechanism being omitted.

This application constitutes a division of my co-pending application Serial No. 330,537, filed January 5th, 1929, and entitled "Door fastener".

The illustrated embodiment of the invention comprises a door latch having a case plate 57 from which a latch bolt 58 projects. This bolt is formed with a shoulder 59 which is engageable by a spring 60 to hold the bolt normally in projected position. A slide 61 is secured to the bolt 58 and is formed with a shoulder 62 adapted to be engaged by a projection 63 on the roll-back member 64. This roll-back member has a rearwardly and downwardly projecting finger 65 which is engageable by the end of a dog 66 to lock the roll-back member with the bolt projected. The dog is pivoted on a pin 67 and projects through a keeper 68 to engage the end of the finger 65. A spring 69 mounted on the pin 67 is adapted to engage a flange 70 at the rear end of the dog to rock the latter out of locking position. A remote control member 71 is connected to the slide 61 by a pin 72 which passes through a slot 73, thereby providing a lost motion connection. When the member 71 is advanced beyond bolt releasing position a nose 74 at its front end engages the finger 70 to rock the dog to locking position. The slide 61 is guided on the outer face of the keeper 68 by a pin 75 which extends through a slot 76 in the slide. It will be noted that when the dog is in locking position and pressure is exerted to rock the roll-back member to retract the bolt, the ends of the finger 65 and the dog 66 have a toggle engagement which prevents the actuation of the bolt, since the movement of the dog is limited by the upper edge of the keeper 68. When the member 71 is withdrawn the dog 66 is adapted to be swung by the spring 69 to the lower end of the keeper 68 and out of engagement with the finger 65. The abutting ends of the finger 65 and the dog 66 are inclined so that one has a cam action on the other. If desired, the inclination of these abutting ends may be such that, when the member 71 is withdrawn from dog actuating position, the retractive movement of the roll-back member 64 will throw the dog to non-locking position without the necessity of employing the spring 69.

Numerous changes in details of construction, arrangement and operation may be effected without departing from the spirit of the invention, especially as defined in the appended claims.

What I claim as new and desire to secure by Letters Patent is:

1. In a door fastener, the combination of a case plate, a latch bolt slidably mounted thereon, a roll-back member for retracting said bolt, a pivoted dog for locking said roll-back member, a keeper through which the dog projects and which limits the movement of the dog in either direction about its pivot, means for moving the dog in one direction into position to lock the roll-back member, and means for moving the dog in the opposite direction to unlocking position when the setting means is withdrawn.

2. In a door fastener, the combination of a case plate, a latch bolt slidably mounted thereon, a roll-back member for retracting said bolt, a pivoted dog for locking said roll-back member, said dog and said roll-back member having projecting ends which meet to constitute a toggle action when the dog is in locking position, a keeper for said dog positively limiting its movement in either direction, means on said keeper for guiding said latch bolt in its slidable movement, and means for positively setting the dog in locking position.

3. A door latch comprising a back plate, a tensioned latch bolt movable over said back plate in a plane parallel thereto, an outside operated roll back for retracting said latch bolt having a downward and rearwardly extending arm, a lever pivoted to said latch plate and engageable with said arm, a link having lost motion connection with said latch bolt and engageable with said lever upon supplementary reverse movement of said link for moving said lever into engagement with said roll back arm, thereby to provide a toggle for preventing operation of said roll back, and a keeper on said back plate projecting outwardly therefrom, said keeper providing a guide for said lever, and said latch bolt bearing against the outer surface of said keeper.

4. A door latch comprising a back plate, a tensioned latch bolt movable over said back plate, a roll back for retracting said latch bolt having an arm projecting therefrom, a tensioned bell crank lever pivoted to said back plate and engageable with said arm providing a toggle thereby to prevent actuation of said roll back, a keeper integral with said back plate and projecting outwardly therefrom adapted to limit the movement of said tensioned lever and a retracting link having a lost motion connection with said bolt engageable with said tensioned lever for actuating the latter into engagement with said roll back arm.

5. A door latch comprising a back plate and a tensioned latch bolt, a roll back for retracting said bolt having a downwardly and rearwardly extending arm, a longitudinally movable link having lost motion connection with said bolt and adapted to retract the same, a lever pivoted to said back plate, and having one end portion thereof disposed in the path of movement of said link when movement in a non-bolt retracting direction is imparted to the latter, the opposite end of said lever being engageable with said arm to form a toggle, thereby to prevent movement of said roll back, spring means for holding said lever in normal position, and a keeper extruded from said back plate providing a guide for said lever and adapted to space said bolt from said back plate.

In testimony whereof I have hereunto signed my name to this specification.

FLETCHER D. GRUND.